Aug. 7, 1956     R. T. HURLEY     2,757,954
INSECT DEFLECTOR FOR AUTOMOBILES
Filed April 25, 1952

INVENTOR.
ROY T. HURLEY

*his* ATTORNEY.

United States Patent Office 2,757,954
Patented Aug. 7, 1956

2,757,954

INSECT DEFLECTOR FOR AUTOMOBILES

Roy T. Hurley, Westport, Conn., assignor to Curtiss-Wright Corporation, a corporation of Delaware Application April 25, 1952, Serial No. 284,400

3 Claims. (Cl. 296—91)

This invention relates to an insect deflector for maintaining the windshield of an automobile clear of insects, etc. at driving speeds of the vehicle, and has for its principal object an improved insect deflector that is automatically operable to deflecting and non-deflecting positions according to the state of motion of the automobile or like vehicle.

Insect deflectors of the vane type are usually mounted on the car hood near the front thereof and may comprise a transparent vane positioned transversely of the direction of motion so that at ordinary driving speeds the air stream is deflected above the hood and windshield along the top of the car thus carrying with it light airborne objects, or particles such as insects, light snow, etc. At normal driving speeds this deflecting action is sufficient to keep the windshield comparatively clear. A common disadvantage however of the ordinary vane deflector is that it is fixed in position and does not harmonize with the streamlining of the modern car and therefore serves no useful purpose when not in operation.

In accordance with the present invention a vane-type insect deflector is pivotally mounted on the car hood so as normally to lie flat and blend with the hood design when the car is stationary or moving slowly, and to be operated by aerodynamic pressure to a deflecting position and held in such position when the speed of the car reaches a moderate rate, such as 25 miles per hour.

This invention will be more fully set forth in the following description referring to the accompanying drawing, and the features of novelty which characterize the invention will be pointed out with particularity in the claims annexed to and forming a part of this specification.

Figure 1:
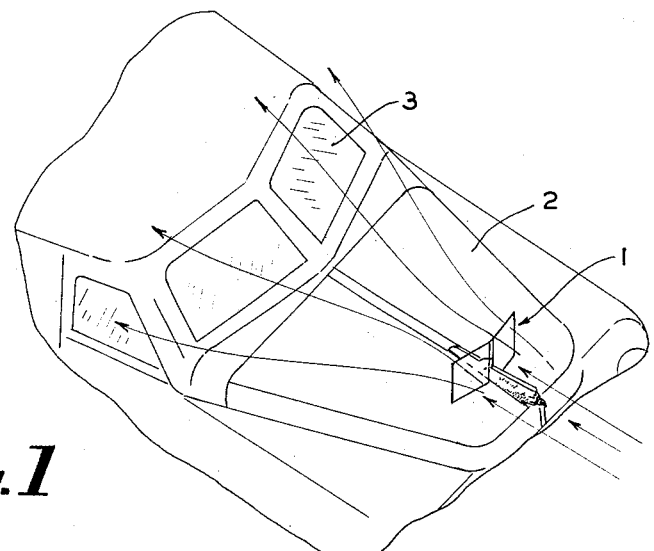
Figure 2:
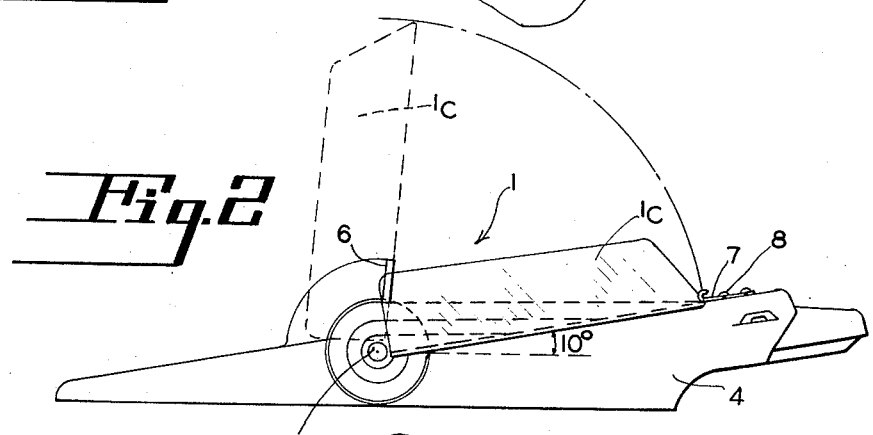
Figure 3:
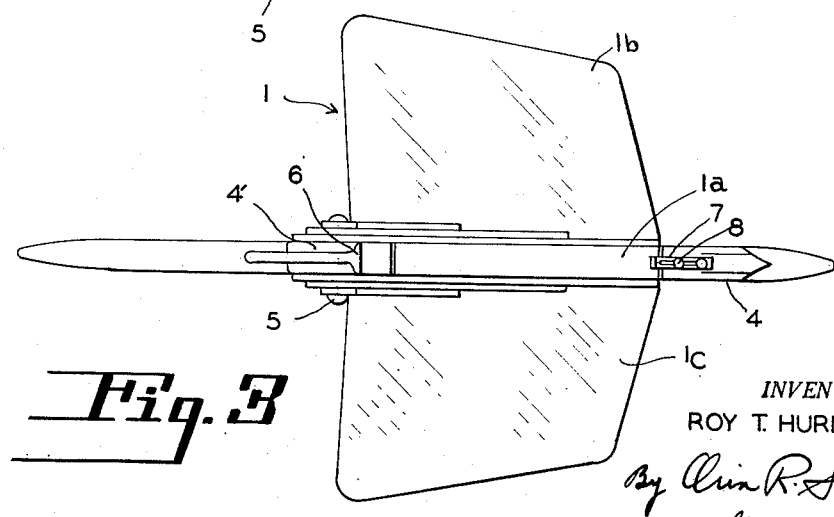

Referring to the drawing, Fig. 1 is a perspective view showing the front portion of an automobile with the insect deflector embodying the present invention in operative position; Fig. 2 is an elevational view of the deflector illustrating two positions of the deflecting vane, and Fig. 3 is a plan view of the insect deflector shown in Fig. 2 in the flat or inoperative position.

Referring to Fig. 1, the insect deflector generally indicated at 1 is shown as mounted on the forward part of the hood or equivalent body portion 2 of a motor vehicle having a windshield 3. The automobile is represented as being in motion at a normal driving speed and the deflector 1, which is positioned transversely of the direction of motion, is in the operative position for deflecting the air stream sufficiently above and along opposite sides of the hood and windshield so that the windshield is kept clear of insects and other light particles. This general function of the deflector is well known in the art.

Referring specifically to Fig. 2, the deflector comprises in a preferred form of the invention a vane supporting member 4 that may be designed as a hood ornament, either permanently attached to the hood as standard equipment or provided with suitable fastening means (not shown) for securing the same to the hood, as for example, to the conventional chrome center strip of the hood. The vane deflector comprises a transparent element composed of a suitable plastic material pivotally mounted on the support 4 by means of a pin 5 journalled in a bearing portion 4' so that the vane is free to rotate counterclockwise through an angle somewhat less than 90° from the flat or inoperative position indicated in full lines in Fig. 2. The movement of the vane is limited by a stop member 6 forming part of the support, this stop being located so that the vane tends to fall forward to the flat position when not supported by wind pressure. As an alternative, the vane may be spring biased toward the flat position. The vane is preferably designed so that it resembles somewhat the wing structure of high speed aircraft so as to form part of the hood ornament and is shown having a swept-back leading edge in Fig. 3 and a dihedral shape in Fig. 2. The central portion of the vane 1a is planar and the two planar "wing" sections 1b and 1c extend from the central section at an angle as indicated in Figs. 1 and 2.

As illustrated in Fig. 2 the vane is shown as having a slight "angle-of-attack" (about 10°) when in the flat position, so that the vane will be forced upward by wind pressure to the deflecting position (indicated by dotted lines) when the driving speed or relative air velocity reaches about 25 miles per hour. The action of the vane in moving to deflecting position is quite positive as it snaps to such position when a predetermined relative air velocity is reached. The vane is naturally held in such position at a lower air velocity than that required to lift the vane from its low angle-of-attack position so that there is no tendency for the vane to "chatter" at marginal speeds.

When it is desired to secure the deflector in the inoperative position where it functions simply as a hood ornament, as when the automobile is parked under windy or gusty conditions or when the vehicle is to be operated during clear weather in seasons when insects are not present, suitable latching means may be used to secure the vane in the flat position. For example, a slotted slide element 7 guided on a pin 8 fixed to the support 4 is adapted to engage the leading edge of the vane portion 1a and hold the vane snugly in the flat position.

It should be understood that this invention is not limited to specific details of construction and arrangement thereof herein illustrated and that changes and modifications may occur to one skilled in the art without departing from the spirit of the invention.

What is claimed is:

1. An insect deflector for a vehicle having a windshield and a hood extending forwardly thereof comprising a vane-like deflector having a normal rest position on the hood at an acute angle to the horizontal, and means mounting said deflector for pivotal movement to a substantially vertical position under the influence of the force of the air stream upon forward movement of the vehicle thereby disposing the deflector in a position for deflecting insects, snow and the like from the windshield of the vehicle, and means for limiting the extent of the pivotal movement with respect to the hood.

2. An insect deflector for a vehicle having a windshield and a hood extending forwardly thereof comprising supporting means mounted on the hood, a vane-like deflector having a normal rest position on the supporting means, means pivotally mounting the deflector at one end on the supporting means, said deflector having an "angle of attack" in said rest position whereby the deflector is swung upwardly from the rest position under the influence of the force of the air stream upon forward movement of the vehicle disposing the deflector in a position for deflecting insects, snow and the like from the windshield of the vehicle, and means for limiting the extent of the swinging movement of the deflector.

3. An insect deflector for a vehicle having a windshield and a hood extending forwardly thereof comprising an elongated body mounted on the hood, a wing structure having a normal rest position on the body, a pivot pin swingably joining the wing structure at one end to the body, said wing structure having an "angle of attack" in said rest position whereby the wing structure is swung upwardly from the rest position under the influence of the force of the air stream upon forward movement of the vehicle disposing the wing structure in a position for deflecting insects, snow and the like from the windshield of the vehicle, and means for limiting the extent of the swinging movement of the deflector.

References Cited in the file of this patent

UNITED STATES PATENTS

| | | |
|---|---|---|
| D. 163,272 | Glass | May 15, 1951 |
| 1,755,630 | Budde | Apr. 22, 1930 |
| 2,049,360 | Erickson | July 28, 1936 |
| 2,112,709 | Reynolds | July 20, 1937 |
| 2,236,846 | Davisson | Apr. 1, 1941 |
| 2,302,672 | Buckley | Nov. 24, 1942 |
| 2,564,213 | Redhead | Aug. 14, 1951 |